United States Patent
Lee et al.

(10) Patent No.: US 9,720,890 B2
(45) Date of Patent: Aug. 1, 2017

(54) SYSTEM AND METHOD FOR RENDERING AN ASSESSMENT ITEM

(71) Applicant: Educational Testing Service, Princeton, NJ (US)

(72) Inventors: Mankit Lee, Plainsboro, NJ (US); Sherry Wang, West Windsor, NJ (US); Kenneth H. Berger, Rocky Hill, NJ (US); Jenny Gray, Jacobstown, NJ (US)

(73) Assignee: Educational Testing Service, Princeton, NJ (US)

( * ) Notice: Subject to any disclaimer, the term of this patent is extended or adjusted under 35 U.S.C. 154(b) by 38 days.

(21) Appl. No.: 14/452,940

(22) Filed: Aug. 6, 2014

(65) Prior Publication Data
US 2015/0046792 A1  Feb. 12, 2015

Related U.S. Application Data

(60) Provisional application No. 61/862,605, filed on Aug. 6, 2013.

(51) Int. Cl.
*G09B 3/00* (2006.01)
*G06F 17/22* (2006.01)
(Continued)

(52) U.S. Cl.
CPC ........ *G06F 17/2247* (2013.01); *G06F 3/0481* (2013.01); *G06F 17/2229* (2013.01); *G09B 7/02* (2013.01); *G09B 7/04* (2013.01)

(58) Field of Classification Search
CPC ........... G06F 17/2247; G06F 17/30905; G06F 17/30896; G06F 17/30893; G06F 17/2229; G09B 7/02; G09B 7/04; G09B 3/00
(Continued)

(56) References Cited

U.S. PATENT DOCUMENTS 6,512,529 B1 * 1/2003 Janssen ................. G06F 3/0481
715/768
6,751,351 B2 * 6/2004 Knowles ................. G09B 7/02
382/181
(Continued)

OTHER PUBLICATIONS

Jack Herrington and Emily Kim, Getting Started with Flex™ 3, Jun. 2008, Published by O'Reilly Media, Inc., 1005 Gravenstein Highway North, Sebastopol, CA 95472, First Edition, Chapters 1-4.*

*Primary Examiner* — Scott Baderman
*Assistant Examiner* — Hassan Mrabi
(74) *Attorney, Agent, or Firm* — Jones Day

(57) ABSTRACT

Systems and methods are provided for rendering an assessment item. A document encoded in a markup language is received. The document includes data that relates to at least one of an appearance and content of an assessment item, and the document includes a reference to a content file. The content file is retrieved, where the content file includes computer-executable instructions for generating an interactive graphical representation for display on a display device. The interactive graphical representation includes one or more features with which a user interacts to respond to the assessment item. The computer-executable instructions are executed based on the data of the document to generate the interactive graphical representation. Data generated based on user manipulation of the one or more features is received. The data generated from the user manipulation is processed to generate a modified graphical representation responsive to the assessment item.

20 Claims, 13 Drawing Sheets

(51) Int. Cl.
*G06F 3/0481* (2013.01)
*G09B 7/02* (2006.01)
*G09B 7/04* (2006.01)

(58) Field of Classification Search
USPC .......................................................... 715/234
See application file for complete search history.

(56) References Cited

U.S. PATENT DOCUMENTS

| | | | | |
|---|---|---|---|---|
| 7,764,923 B2* | 7/2010 | Saito | ................ | G09B 7/02 434/353 |
| 7,953,275 B1* | 5/2011 | Wolfram | ................ | G06T 15/04 382/167 |
| 8,019,182 B1* | 9/2011 | Wolfram | ................ | G06T 11/60 345/698 |
| 8,140,404 B1* | 3/2012 | Scott | ................ | G06Q 30/0601 705/26.1 |
| 2003/0041110 A1* | 2/2003 | Wenocur | ............. | G06Q 10/107 709/206 |
| 2004/0029092 A1* | 2/2004 | Orr | ......................... | G09B 7/02 434/354 |
| 2004/0153508 A1* | 8/2004 | Alcorn | ................ | G06Q 30/06 709/205 |
| 2004/0153509 A1* | 8/2004 | Alcorn | ................ | G06Q 30/06 709/205 |
| 2005/0261895 A1* | 11/2005 | Bauer | .................... | G10L 25/69 704/216 |
| 2005/0287509 A1* | 12/2005 | Mohler | ................... | G09B 7/00 434/350 |
| 2007/0139430 A1* | 6/2007 | Korn | ................ | G06F 17/30905 345/581 |
| 2007/0201752 A1* | 8/2007 | Gormish | ........... | G06K 9/00442 382/232 |
| 2009/0006191 A1* | 1/2009 | Arankalle | ............... | G06Q 30/02 705/14.71 |
| 2009/0006375 A1* | 1/2009 | Lax | ...................... | H04N 21/435 |
| 2009/0119614 A1* | 5/2009 | Tienvieri | .......... | G06F 17/30277 715/786 |
| 2009/0144772 A1* | 6/2009 | Fink | ...................... | G06Q 30/02 725/42 |
| 2009/0158214 A1* | 6/2009 | Arnold | ............. | G06F 17/30058 715/830 |
| 2009/0164923 A1* | 6/2009 | Ovi | ...................... | G06F 3/0482 715/764 |
| 2009/0172727 A1* | 7/2009 | Baluja | .................... | G06Q 30/00 725/34 |
| 2009/0292980 A1* | 11/2009 | Swineford | .......... | G06F 17/2205 715/202 |
| 2013/0227607 A1* | 8/2013 | Saltonstall | ........... | H04N 21/458 725/35 |
| 2014/0032482 A1* | 1/2014 | Dulaney | ........... | G06F 17/30056 707/607 |
| 2014/0033046 A1* | 1/2014 | Walsh | ................ | G06F 17/2229 715/730 |
| 2014/0033047 A1* | 1/2014 | Poling | .................... | G06F 3/048 715/730 |
| 2014/0212057 A1* | 7/2014 | Konnola | .................... | G06T 9/00 382/232 |
| 2014/0214731 A1* | 7/2014 | Granny | ..................... | G06F 8/34 706/11 |

* cited by examiner

```xml
<?xml version="1.0" encoding="UTF-8"?>
<item>
<item_information response_class="FreeResponse" response_type="GenericString" cbt_format="etsbsd01.fmt" accession_number="JC491879" item_name="Interactive" delivery_mode="XML" section="standard"
program="ETS"/>
<item_content>
    <item_stem>
        <stem_paragraph>
            John wants to find out the relationship between a side length and
            an area of a square. He measured side lengths of squares that
            are 2, 3, and 1, and measured areas for the squares that are 4,
            9, and 1, respectively. Use the tool below to help find the
            relationship of the side length and the area of a square.
        </stem_paragraph>
    </item_stem>
```

FIG. 3A

```xml
<item_response>
  <interactive_with_response delivery_mode="CBT" mimetype="zip" width="800" height="400"
    external_file_name="BestFitLine-InputChart.zip" name="JC491879.101"/>         ← 366
    <initial_parameters>
      <initial_parameter>
        <name>xAxisLabel</name>
        <value>X-Axis</value>
      </initial_parameter>
      <initial_parameter>
        <name>yAxisLabel</name>
        <value>Y-Axis</value>
      </initial_parameter>
    </initial_parameters>
  </interactive_with_response>
  ...
</item_response>
<item_content>
  ...
</item>
```

FIG. 3B

BestFitLine-InputChart.zip

CSS (folder)

IMG (folder)

LIB (folder)

BestFitLineInputChart.js (JavaScript script file)

InteractionCommons-1.0.js (JavaScript script file)

Interaction-1.0.js (JavaScript script file)

Main.html (HTML document)

Web.config (XML Configuration file)

500

700

| Function Name | Description | Parameters | Return | JavaScript example |
|---|---|---|---|---|
| getExtInputParams | External initial input parameters, like showResponse, runMode, and all initial_parameters from item ctl file | None | JSON string | var result = top. getExtInputParams (); var x = JSON.parse(result); |
| saveResponseforExtUse | Return response to System | string | void | saveResponseforExtUse ("the response string"); |
| saveItemStateonExt | Return item state to System | JSON string | void | saveItemStateonExt ("the item state string"); |
| getExtResponse | Get the response from External source | None | string | var resp = top.getExtResponse (); |
| getExtCorrectResponse | Get the correct response from External source | None | string | var resp = top.getExtCorrectResponse (); |
| getExtStyleURL | This function returns url of any external style .css file applicable else empty returns an empty string. | None | string | var url = top. getExtStyleURL (); |

| Variable Name | Description | Function | Values | Default Value |
|---|---|---|---|---|
| showResponse | Flag indicates show/hide the response string | getExtInputParams | "1" – show response<br><br>"0" – not show | "1" |
| runMode | Flag indicates development mode or production mode | getExtInputParams | "1" – dev mode, show navigation buttons<br><br>"0" – production mode, hide navigation buttons | "1" |
| reviewMode | Flag indicates review mode, so no change can be made; or normal testing mode | getExtInputParams | "1" – review mode, disable change response<br><br>"0" – not review mode | "0" |
| width | Width of the item frame | getExtInputParams | Integer in string type, value range 100 – 1004(px) | "1004" |
| height | Height of the item frame | getExtInputParams | Integer in string type, value range 100 – 638(px) | "638" |
| savedResponse | Saved response from previous visit | getExtInputParams /getExtResponse | String | "" |
| savedItemState | Saved item state from previous visit to be restored if the tester comes back to the item again | getExtInputParams | String | "" |
| sequenceNo | Saved sequence No from previous visit for multi-page items | getExtInputParams | Integer in string type | "1" |
| correctResponse | Correct answer to the item | getExtCorrectResponse | String | "" |

FIG. 7B

SYSTEM AND METHOD FOR RENDERING AN ASSESSMENT ITEM

CROSS-REFERENCE TO RELATED APPLICATIONS

This application claims priority to U.S. Provisional Patent Application No. 61/862,605, filed Aug. 6, 2013, entitled "Rendering HTML5 Interactive Items," which is incorporated herein by reference in its entirety.

FIELD

The technology described in this patent document relates generally to computer-based testing and more particularly to computer-implemented systems and methods for rendering an assessment item.

BACKGROUND

In large-scale standardized tests, multiple-choice questions are widely used because they can be scored objectively, quickly, and at low cost. However, such questions generally only test for recognition of correct answers and do not require constructed responses (i.e., responses constructed in the mind of the examinee rather than chosen from a list of options). For some educators, use of a constructed response examination is preferred versus a multiple-choice examination because the constructed response examination requires the examinee to understand and communicate concepts of the tested subject matter. For this reason and others, there has been an effort to develop alternative question types for standardized testing.

SUMMARY

The present inventors have observed a need for sophisticated computerized alternative question types that use figural response items. Figural response items call for constructed responses and depend upon figural material, such as illustrations and graphs, as the response medium. In a figural response item, for example, an examinee may respond to a question by carrying out operations to edit or create a graph, or manipulate interactive features, images, and multimedia elements in generating a constructed response.

The present disclosure is directed to a computer-implemented method, system, and non-transitory computer-readable storage medium for rendering an assessment item. In an example computer-implemented method for rendering an assessment item, a document encoded in a markup language is received. The document includes data that relates to at least one of an appearance and content of an assessment item, and the document includes a reference to a content file. The content file is retrieved with a processing system, where the content file includes computer-executable instructions for generating an interactive graphical representation for display on a display device. The interactive graphical representation includes one or more features with which a user interacts to respond to the assessment item to generate a modified graphical representation responsive to the assessment item. Using the processing system, the computer-executable instructions are executed based on the data of the document to generate the interactive graphical representation for display to the user. Data generated based on user manipulation of the one or more features of the interactive graphical representation is received at the processing system. The data generated from the user manipulation is processed to generate the modified graphical representation responsive to the assessment item.

An example system for rendering an assessment item includes a processing system and a memory in communication with the processing system. The processing system is configured to execute steps. In executing the steps, a document encoded in a markup language is received. The document includes data that relates to at least one of an appearance and content of an assessment item, and the document includes a reference to a content file. The content file is retrieved, where the content file includes computer-executable instructions for generating an interactive graphical representation for display on a display device. The interactive graphical representation includes one or more features with which a user interacts to respond to the assessment item to generate a modified graphical representation responsive to the assessment item. The computer-executable instructions are executed based on the data of the document to generate the interactive graphical representation for display to the user. Data generated based on user manipulation of the one or more features of the interactive graphical representation is received. The data generated from the user manipulation is processed to generate the modified graphical representation responsive to the assessment item.

In an example non-transitory computer-readable storage medium for rendering an assessment item, the computer-readable storage medium includes computer-executable instructions which, when executed, cause a processing system to execute steps. In executing the steps, a document encoded in a markup language is received. The document includes data that relates to at least one of an appearance and content of an assessment item, and the document includes a reference to a content file. The content file is retrieved, where the content file includes computer-executable instructions for generating an interactive graphical representation for display on a display device. The interactive graphical representation includes one or more features with which a user interacts to respond to the assessment item to generate a modified graphical representation responsive to the assessment item. The computer-executable instructions are executed based on the data of the document to generate the interactive graphical representation for display to the user. Data generated based on user manipulation of the one or more features of the interactive graphical representation is received. The data generated from the user manipulation is processed to generate the modified graphical representation responsive to the assessment item.

BRIEF DESCRIPTION OF THE DRAWINGS

FIGS. 3A and 3B depict example XML source code used in rendering an assessment item.

FIG. 7A depicts a table with information on example JavaScript functions employed by a system for rendering HTML5 content.

FIG. 7B depicts a table with information on example initial parameters that may be received by a system for rendering HTML5 content.

DETAILED DESCRIPTION

Figure 1:
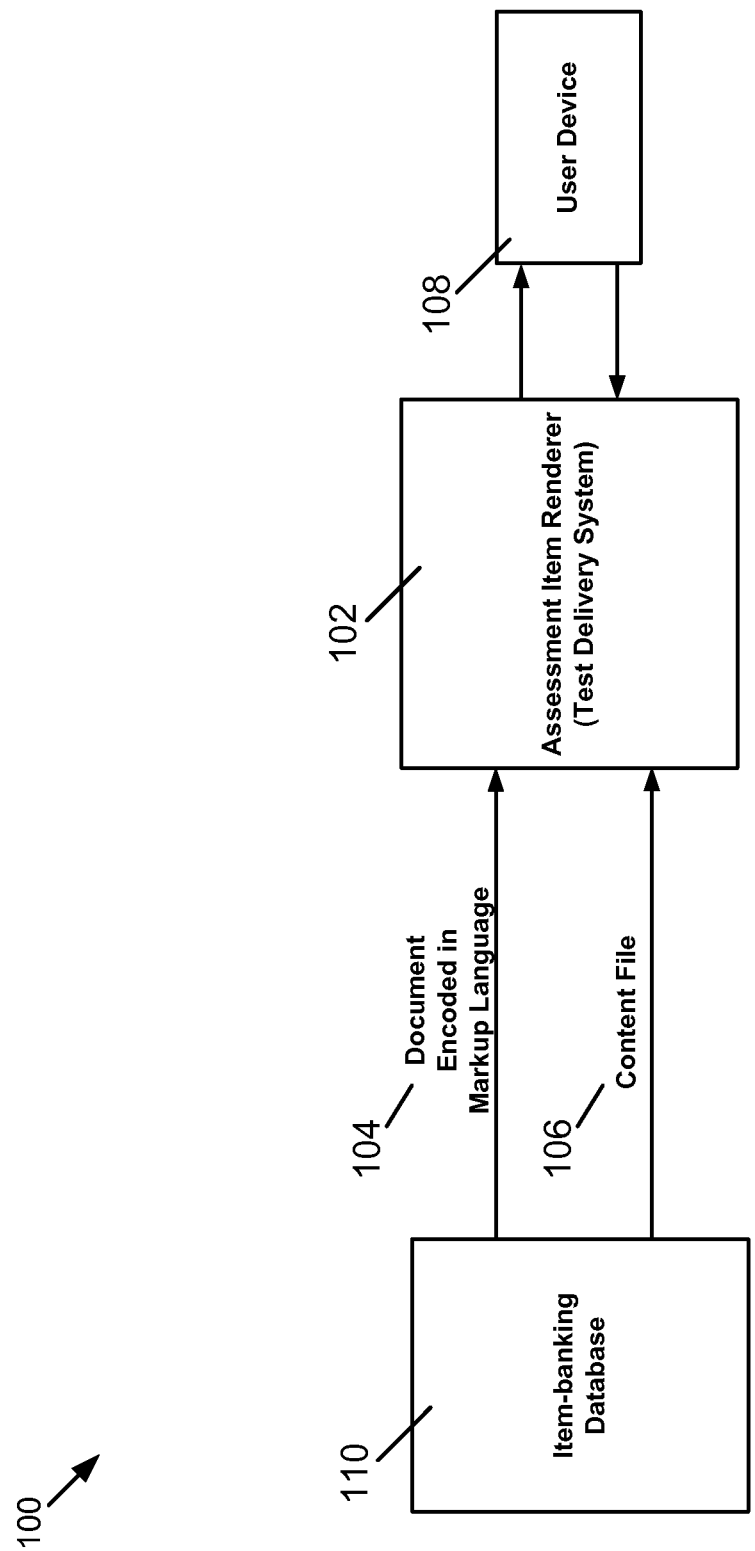
FIG. 1 is a block diagram illustrating an example computer-based system for rendering an assessment item.

FIG. 1 is a block diagram 100 illustrating an example computer-based system for rendering an assessment item. The system includes an assessment item renderer 102 that uses a processing system to render the assessment item for display at a user device 108. The assessment item renderer 102 may comprise a test delivery system, with the assessment item being a test question used in determining an understanding or skill of a user. The user device 108 may be a desktop computer, laptop computer, smartphone, tablet device, or another computing device that includes a display device (i.e., monitor, screen, etc.) for displaying the assessment item rendered by the assessment item renderer 102. The user device 108 may further include an input device, such as a keyboard, mouse, microphone, touchscreen, etc., for responding to the assessment item displayed on the display device. As illustrated in the example of FIG. 1, communication between the assessment item renderer 102 and the user device 108 may be "two-way," such that the assessment item renderer 102 is able to transmit data to the user device 108 and also receive user response data from the user device 108.

To render the assessment item, the assessment item renderer 102 receives a document encoded in a markup language 104 and a content file 106. The document encoded in the markup language 104 may include i) data that relates to at least one of an appearance and content of the assessment item, and ii) a reference to the content file 106. The content file 106 may be separate from (i.e., external to) the document 104. The data relating to the appearance or content of the assessment item may include, for example, a question stem for the assessment item (e.g., "Use the tool below to draw a square having sides with lengths equal to 2."), input parameters that define a size of an image displayed in the assessment item, and other input parameters that define text to be displayed alongside the image. As described in greater detail below, such data of the document 104 may be combined with computer-executable instructions of the content file 106 to generate an interactive graphical representation for display on a display device, where the interactive graphical representation may comprise a portion or an entirety of the assessment item that is displayed to a user. For brevity, the interactive graphical representation may be referred to herein as an "interactive display."

The markup language used in encoding the document 104 may be extensible markup language (XML), hypertext markup language (HTML), generalized markup language (GML), extensible hypertext markup language (XHTML), a variant of one of these languages, or another markup language. In general, a markup language may define a system for annotating a document in a manner that is syntactically distinguishable from text of the document. Such markup languages may include tags to mark the start and end of elements, where an element is a logical unit of information in the document. Although examples below describe the use of XML for encoding the document 104, it should be understood that the use of XML is exemplary only and that other types of markup and non-markup languages may be used in encoding the document 104.

As described above, the document encoded in the markup language 104 may include a reference to the content file 106, where the content file 106 may be separate from the document 104. The reference to the content file 106 may take various different forms. In an example, the reference to the content file 106 includes the name of the content file 106 (e.g., "BestFitLine-InputChart.zip") and/or the path of the content file 106 (e.g., "C: \\My Documents\Content\Docs\BestFitLine-InputChart.zip"). In another example, the reference to the content file 106 in the document 104 includes a pointer or a reference to a specific memory location or network address. In general, the reference to the content file 106 includes details of a name or address of the content file 106 or other details that permit the content file 106 to be identified or accessed.

The assessment item renderer 102 may retrieve the content file 106 using a processing system based on the reference to the content file 106 included in the document 104. In an example, the retrieved content file 106 includes computer-executable instructions for generating an interactive display (i.e., an interactive graphical representation) for display on a display device. For example, in an embodiment, the computer-executable instructions for generating the interactive display are not included in the markup language document 104 but rather are included in the content file 106. The interactive display may include, for example, images, text, audio content, video content, and/or multimedia content for presenting the question stem or another aspect of the assessment item to the user. The interactive display further includes one or more features with which a user interacts to respond to the assessment item to generate a modified graphical representation responsive to the assessment item.

In an example, a question stem of an assessment item reads, "Use the tool below to draw a square having sides with lengths equal to 2 that is centered at coordinates x=10 and y=11." In this example, the interactive display may include an image of a graph having x- and y-axes, tickmarks, and gridlines. The interactive display of this example may further include text input boxes, checkboxes, buttons, graphical components, and/or other features that allow the user to draw one or more points, lines, or shapes on the graph. Interacting with these features allows the user to respond to the question stem and change the interactive display. For example, although the interactive display may initially include a blank graph including no plotted points, the user's interaction with the text input box, checkbox, button, graphical component, and/or other features may alter the graph and cause one or more points or lines to be plotted on the graph.

The assessment item renderer 102 may execute the computer-executable instructions included in the content file 106 based on the data of the document 104 to generate the interactive display. As explained above, the data of the document 104 may include data that defines at least one of an appearance and content of the assessment item. Thus, for example, the data of the document 104 may include input parameters for defining a length and width of a graph. In this example, the assessment item renderer 102 may execute the computer-executable instructions of the content file 106 based on the length and width parameters of the document 104 to generate a graph having the specified length and width. For example, the length and width parameters included in the document 104 may be utilized by the computer-executable instructions as arguments within a function call.

The document 104 and the content file 106 may be received at the assessment item renderer 102 from an item-banking database 110. The renderer 102 and the item-banking database 110 may comprise parts of a single computer system (e.g., the renderer 102 and database 110 may comprise subsystems of a standalone computer system) or the renderer 102 and database 110 may be located remotely from one another, such that the renderer 102 may access the database 110 via a network (e.g., a local area network, the Internet, etc.). The item-banking database 110 may be stored on a non-transitory computer-readable storage medium. The approaches for rendering an assessment item described herein permit virtually any type of assessment item to be stored in the item-banking database 110 and rendered via the assessment item renderer 102. The example item described above having the question stem, "Use the tool below to draw a square having sides with lengths equal to 2 that is centered at coordinates x=10 and y=11," is illustrative of the types of non-multiple-choice, figural response items that may be stored in the item-banking database 110 and rendered by the assessment item renderer 102. It should be understood, however, that the approaches described herein may be used to render items of any type, and such items are not limited to figural response items.

Figure 2:
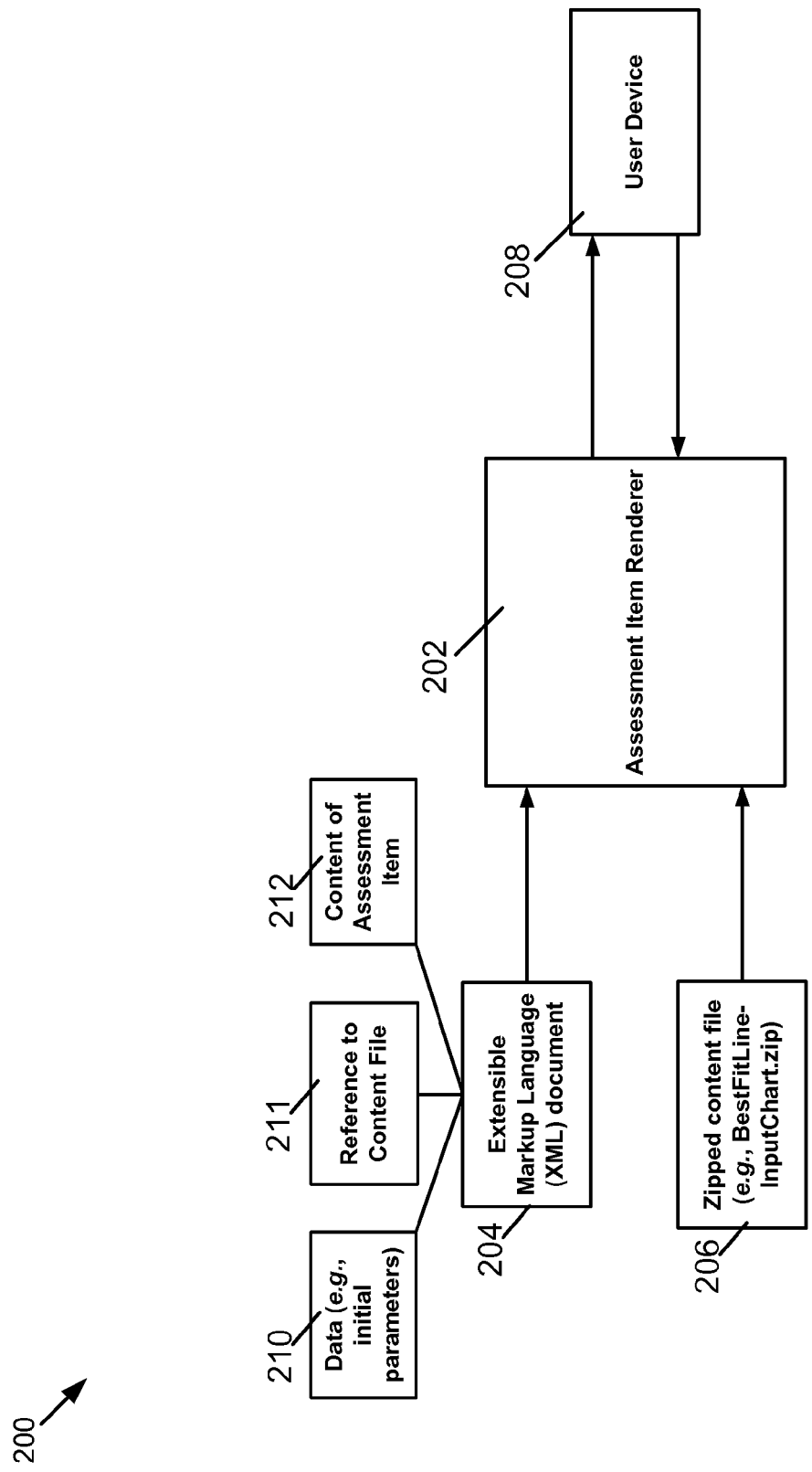
FIG. 2 is a block diagram illustrating an example computer-based system for rendering an assessment item, where the assessment item is rendered based on an extensible markup language (XML) document and a zipped content file.

FIG. 2 is a block diagram 200 illustrating an example computer-based system for rendering an assessment item, where the assessment item is rendered based on an extensible markup language (XML) document 204 and a zipped content file 206. The computer-based system of FIG. 2 includes an assessment item renderer 202 that renders the assessment item for display at a user device 208. The user device 208 communicates with the assessment item renderer 202 and is used in i) displaying the assessment item on a display device, and ii) receiving data from an input device based on user manipulation of one or more interactive features of the assessment item. The data received from the input device may be transmitted from the user device 208 to the assessment item renderer 202, thus allowing the assessment item renderer 202 to store a user's response to the assessment item and/or update the display of the assessment item on the display device.

The assessment item renderer 202 receives the XML document 204 and the zipped content file 206 and uses these items in rendering the assessment item. The XML document 204 may include i) data 210 that relates to at least one of an appearance and content of the assessment item, ii) a reference 211 to the zipped content file 206, and iii) optionally, additional content 212 for the assessment item. An example XML document that includes such information is depicted in FIGS. 3A and 3B. These figures depict example XML source code that may be used in combination with a zipped content file to render an assessment item. With reference to FIG. 3A, source code 300 is encoded in XML and includes data for an assessment item, as indicated by the opening <item> tag 301. Nested within the opening <item> tag 301 and its corresponding closing </item> tag (illustrated in FIG. 3B) are various item information parameters 303 and other data surrounded by opening and closing tags that are used in rendering the assessment item.

As described above with reference to FIG. 2, an XML file may include content of the assessment item (e.g., the content 212). An example of such content is illustrated in the source code 300 of FIG. 3A. Within opening and closing tags for "item_stem" and "stem_paragraph," the source code 300 includes content 302 for the assessment item that is the question stem "John wants to find out the relationship between a side length and an area of a square. He measured side lengths of squares that are 2, 3, and 1, and measured areas for the squares that are 4, 9, and 1, respectively. Use the tool below to help find the relationship of the side length and the area of a square." Including content such as this in the XML file is optional. Thus, in other examples, all content for the assessment item is included in the zipped content file 206, and the XML file 204 is used only in providing input parameters and other non-content data for rendering the assessment item.

The XML file may also include a reference to a content file (e.g., the reference 211 in the example of FIG. 2). An example of such a reference to a content file is illustrated in the source code 330 of FIG. 3B. Within opening and closing tags for "item_response" and "interactive_with_response," the source code 330 includes a reference 332 to a zipped content file "BestFitLine-InputChart.zip." The zipped content file BestFitLine-InputChart.zip is external to the XML source code illustrated in FIGS. 3A and 3B and may include computer-executable instructions for generating an interactive display portion of the assessment item (i.e., an interactive graphical representation for display on a display device). In an example, the computer-executable instructions included in the zipped content file BestFitLine-InputChart.zip comprise JavaScript code that is executed based on data from the XML source code 330, 332 of FIGS. 3A and 3B.

The XML file may further include data that relates to at least one of an appearance and content of the assessment item (e.g., the data 210 in the example of FIG. 2). An example of such data relating to the appearance or content of the assessment item is illustrated in the source code 330 of FIG. 3B. Within opening and closing tags for "initial_parameter," the source code 330 includes data 362, 364 defining labels for x- and y-axes of a graph. In an example, the BestFitLine-InputChart.zip file is retrieved based on the reference 332 to the file included in the source code 330 of the XML document. The BestFitLine-InputChart.zip file includes computer-executable instructions for generating an interactive display that includes i) a graph, and ii) one or more features with which a user interacts to respond to the assessment item to generate a modified graphical representation responsive to the assessment item. In generating the interactive display, the computer-executable instructions of the BestFitLine-InputChart.zip file are executed based on the data 362, 364, such that the graph included in the interactive display includes x- and y-axis labels that read "X-Axis" and "Y-Axis," respectively. Such data relating to at least one of an appearance and content of the assessment item may comprise, for example, initial parameters for generating the interactive display, as evidenced by the opening and closing "initial_parameter" tags in the source code 330 of FIG. 3B.

Other data relating to the appearance or content of the assessment item may be defined outside of the "initial_parameter" tags in the source code 330. For example, data 366 for defining a width and height of an interactive response area is included in the source code 330. Like the data included within the "initial_parameter" tags, the data 366 may be used in the executing of the computer-executable instructions of the BestFitLine-InputChart.zip file to generate the interactive graph display. Specifically, the computer-executable instructions of the BestFitLine-InputChart.zip file may be executed based on the data 366, such that a resulting interactive response area has a width of 800 pixels and a height of 400 pixels, as dictated by the data 366. In an example, the computer-executable instructions of the Best-FitLine-InputChart.zip file are included in one or more JavaScript files.

Figure 4A:
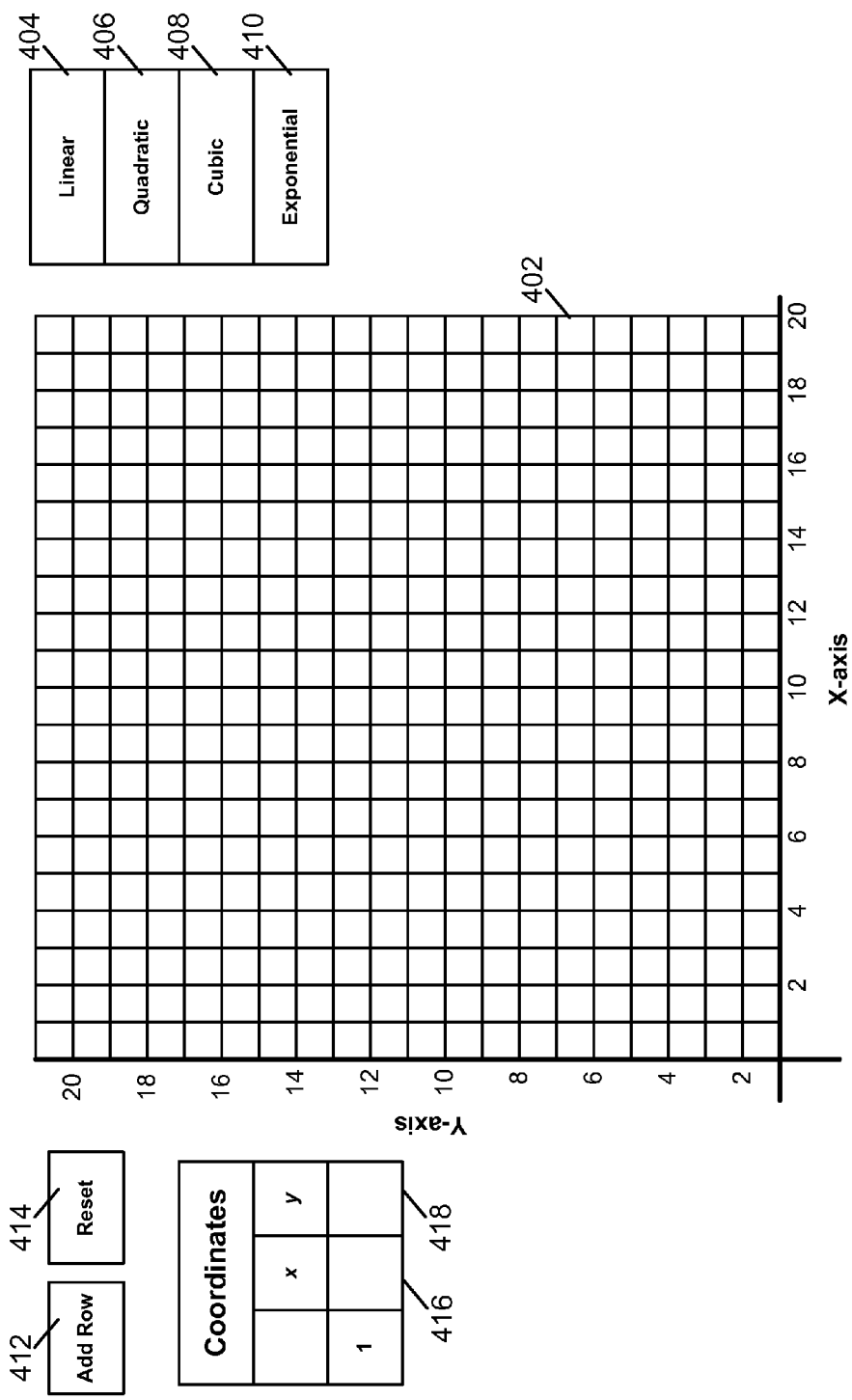
FIGS. 4A and 4B depict an example figural response item.
Figure 4B:
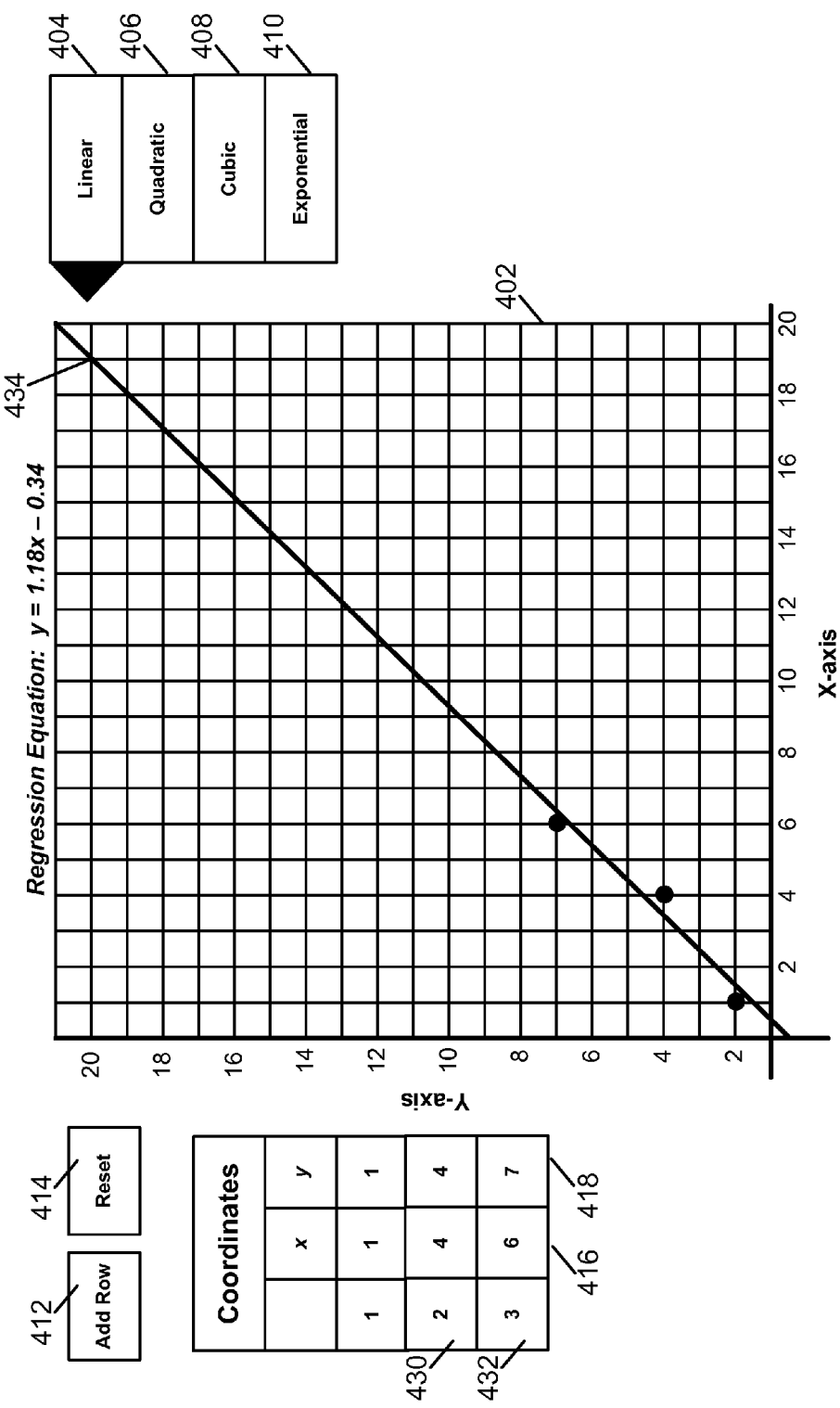

FIGS. 4A and 4B depict an example figural response item that may be generated using the approaches described herein. In rendering the figural response item of FIGS. 4A and 4B, the following XML source code may be received at an assessment item renderer:

```
<?xml version="1.0" encoding="UTF-8"?>
<item>
<item_information response_class="FreeResponse"
response_type="GenericString" cbt_format="etsbsd0l.fmt"
accession_number="JC491879" item_name="Interactive"
delivery_mode="XML"
section="Standard" program="ETS"/>
<item_content>
<task>
  <item_stem>
    <stem_paragraph>John wants to find out the relationship
    between a side length and an area of a square. He measured
    side lengths of squares that are 2, 3, and 1, and measured
    areas for the squares that are 4, 9, and 1, respectively.
    Use the tool below to help find the relationship of the
    side length and the area of a square.</stem_paragraph>
  </item_stem>
<item_response>
<interactive_with_response>
<interactive_file delivery_mode="CBT"
mimetype="zip" width= "800"
height="400" external_file_name="BestFitLine-InputChart.zip"
name="JC491879.101"/>
    <initial_parameters>
      <initial_parameter>
        <name>maxDigits</name>
        <value>3</value>
      </initial_parameter>
      <initial_parameter>
        <name>allowDecimal</name>
        <value>true</value>
      </initial_parameter>
      <initial_parameter>
        <name>allowNegative</name>
        <value>false</value>
      </initial_parameter>
      <initial_parameter>
        <name>xAxisLabel</name>
        <value>X-Axis</value>
      </initial_parameter>
      <initial_parameter>
        <name>yAxisLabel</name>
        <value Y-Axis</value>
      </initial_parameter>
      <initial_parameter>
        <name>graphLineColor</name>
        <value>Blue </value>
      </initial_parameter>
      <initial_parameter>
        <name>showFormula</name>
        <value>Yes</value>
      </initial_parameter>
      <initial_parameter>
        <name>formulaButtons</name>
        <value>4</value>
      </initial_parameter>
      <initial_parameter>
        <name>graphMaxRangeX</name>
        <value>20</value>
      </initial_parameter>
      <initial_parameter>
        <name>graphMinRangeX</name>
        <value>0</value>
      </initial_parameter>
      <initial_parameter>
        <name>graphMaxRangeY</name>
        <value>0</value>
      </initial_parameter>
      <initial_parameter>
        <name>graphWidth</name>
        <value>350</value>
      </initial_parameter>
      <initial_parameter>
        <name>graphHeight</name>
        <value>300</value>
      </initial_parameter>
</interactive_with_response>
</item response>
</task>
</item_content>
</item>
```

The XML source code reproduced above includes content for an assessment item (e.g., the question stem "John wants to find out the relationship between a side length and an area of a square. He measured side lengths of squares that are 2, 3, and 1, and measured areas for the squares that are 4, 9, and 1, respectively. Use the tool below to help find the relationship of the side length and the area of a square."), data that relates to at least one of an appearance and content of the assessment item (e.g., data included within the initial parameter tags, data defining a width and height of an interactive response area, etc.), and a reference to a content file (e.g., the portion of the code stating, "external_file_name='BestFitLine-InputChart.zip'"). It should be understood that the XML source code reproduced above is exemplary only and that other XML source code may be used in generating the example assessment item of FIGS. 4A and 4B.

To render the assessment item illustrated in FIG. 4A, the zipped content file BestFitLine-InputChart.zip referenced in the XML code is retrieved. The BestFitLine-InputChart.zip file includes computer-executable instructions for generating the graph 402, buttons 404, 406, 408, 410, 412, 414, and text input boxes 416, 418. The graph, buttons, and text input boxes comprise portions of an interactive display (i.e., an interactive graphical representation for display on a display device), where the buttons and text input boxes comprise features with which a user interacts to respond to the assessment item to generate a modified graphical representation responsive to the assessment item. The computer-executable instructions of the BestFitLine-InputChart.zip file are executed based on data included in the XML source code reproduced above. Specifically, the computer-executable instructions of the BestFitLine-InputChart.zip file are executed based on the data in the XML source code that relates to an appearance or content of the assessment item. Such data defines, for example, i) a maximum number of digits that can be entered into text input boxes 416, 418, ii) whether decimal numbers are permitted to be entered into the text input boxes 416, 418, iii) whether negative numbers are permitted to be entered into the text input boxes 416, 418, iv) labels for the x- and y-axes of the graph 402, v) a color of a graph line for connecting points on the graph 402, vi) and width and height values for the graph 402, among other data. This data may be utilized by the computer-executable instructions as arguments within one or more function calls, for example, to generate the interactive display illustrated in FIG. 4A.

The figural response item of FIG. 4A may be displayed via a display screen of a user device. User input may be received via the buttons 404, 406, 408, 410, 412, 414 and text input boxes 416, 418 of the interactive display to respond to the assessment item to generate a modified graphical representation responsive to the assessment item.

Such a modified graphical representation is illustrated in FIG. 4B. To generate the modified graphical representation illustrated in FIG. 4B, the user may press the "Add Row" button 412 to add rows 430, 432 for plotting additional coordinates on the graph 402. The user may further use the text input boxes 416, 418 to input coordinate values for points that are plotted on the graph 402. After plotting the points on the graph 402, the user may press the "Linear" button 404 to determine a best-fit linear equation for the plotted points. The user's pressing of the "Linear" button may cause the line 434 to be plotted and may also cause "Regression Equation: y=1.18x−0.34" to be displayed above the graph 402. Thus, as illustrated in FIGS. 4A and 4B, the user interacts with the interactive features 404, 406, 408, 410, 412, 414, 416, 418 to respond to the assessment item to generate the modified graphical representation responsive to the assessment item.

The XML source code and zipped content file used to render the assessment item illustrated in FIGS. 4A and 4B may be stored in an item banking system and transmitted to an assessment item renderer for rendering. It should be understood that the assessment item illustrated in FIGS. 4A and 4B is exemplary only and that variations of the XML source code and zipped content file described above may be used in generating any kind of interactive assessment item. For example, a zipped content file may include computer-executable instructions for rendering interactive content that allows the user to generate a number line, generate a line plot, draw a picture, complete a math problem, arrange graphical objects for presentation or for execution of a computer simulation in the graphical representation, or provide markings to correct errors in a sentence or paragraph.

The approaches for rendering an assessment item described herein permit custom item behavior to be embedded within an XML file that conforms to an XML item definition. An XML item definition may specify valid elements that may appear in an XML file. For example, an XML item definition may specify that an assessment item defined in XML can include item stem and item response elements. In conventional approaches, this XML item definition may be rigid and may allow only a limited number of structured item types (e.g., multiple choice questions, questions requesting a response to be formulated using text, etc.) to be defined. In the conventional approaches, the XML item definition permits only minimal variation between items (e.g., changing a number of multiple-choice options available, changing text of the stem or response choices, etc.) and cannot be used in rendering custom interactive items (e.g., items similar to the assessment item described above with reference to FIGS. 4A and 4B). By contrast, in the approaches described herein, the reference to the external content file may be used to embed custom, interactive content into a standard XML item definition. For example, the approaches described herein can be used in rendering the custom, interactive content even within the context of the basic XML item definition described above (i.e., the XML item definition specifying that XML for an item can include only stem and item response elements). This may allow a standard XML item definition to support interactive content of nearly any kind Using this technique, without introducing new item definitions, custom item behavior for custom item needs may be implemented.

Figure 5:
FIG. 5 depicts contents of a zipped content file, where the zipped content file includes hypertext markup language (HTML) and JavaScript files that are used in rendering an assessment item.

FIG. 5 depicts contents of a zipped content file 500, where the zipped content file 500 includes hypertext markup language (HTML) and JavaScript files that are used in rendering an assessment item. As described above, an assessment item may be rendered based on an XML document and a zipped content file, and FIG. 5 depicts contents of an example zipped content file BestFitLine-InputChart.zip. In FIG. 5, a "CSS" folder included within the zipped file may include information encoded in the Cascading Style Sheets (CSS) language for describing an appearance and/or formatting of the assessment item. An "IMG" folder included within the BestFitLine-InputChart.zip file may include various images that are used in rendering the assessment item. The images of the IMG folder may be accessed and/or manipulated by the computer-executable instructions of the zipped content file in the rendering of the assessment item. In an example, the computer-executable instructions may be executed to generate an interactive display (i.e., an interactive graphical representation for display on a display device) including one or more clickable buttons, and images of buttons from the IMG folder may be used in rendering the clickable buttons within the display. A "LIB" folder may include various library files that are utilized by the computer-executable instructions of the zipped content file. For example, the LIB folder may include JavaScript libraries used by the JavaScript files included within the BestFitLine-InputChart.zip file.

The BestFitLine-InputChart.zip file may further include three JavaScript files, "BestFitLineInputChart.js," "InteractionCommons-1.0.js," and "Interaction-1.0.js," as illustrated in FIG. 5. These JavaScript files may include computer-executable instructions for generating an interactive display portion of an assessment item. For example, with reference to FIG. 4A, executable instructions in the BestFitLineInputChart.js, InteractionCommons-1.0.js, and Interaction-1.0.js files may be used to form the graph 402, buttons 404, 406, 408, 410, 412, 414, and text input boxes 416, 418. Further, upon receiving data from an input device based on user manipulation of the buttons or text input boxes, computer-executable instructions of the BestFitLineInputChart.js, InteractionCommons-1.0.js, and Interaction-1.0.js files may be executed to update the interactive display. An example updating of the interactive display based on these JavaScript files may be illustrated in FIG. 4B.

The BestFitLine-InputChart.zip file of FIG. 5 may further includes a "Main.html" file and a "Web.config" file. In an example, the Main.html file is an entry file that is configured to invoke a plurality of functions, where the plurality of functions may include a first function for retrieving data from an XML document and a second function for saving the data from the input device to a storage device or a server, among others. An example use of the Main.html entry file is described in greater detail below with reference to FIG. 6. The Web.config file includes settings and configuration parameters for the assessment item. For example, the Web.config file may include information that controls module loading, security configurations, session state configurations, application language, and compilation settings of the assessment item. The Web.config file may be encoded in the XML language or another language.

It should be understood that the files and folders included in the zipped content file of FIG. 5 are examples only and that other files and folders may be used in other examples. Further, although FIG. 5 and other examples described herein utilize a zipped file or zipped input stream, it should be understood that the use of zipped data is exemplary only and that such zipped data need not be used in rendering an assessment item according to the approaches described herein. For example, other types of packaging formats are used in other examples (e.g., .RAR files, etc.), such that any type of archive file or package file may be used instead of the zipped file described herein. In other examples, packaging is not used.

Figure 6:
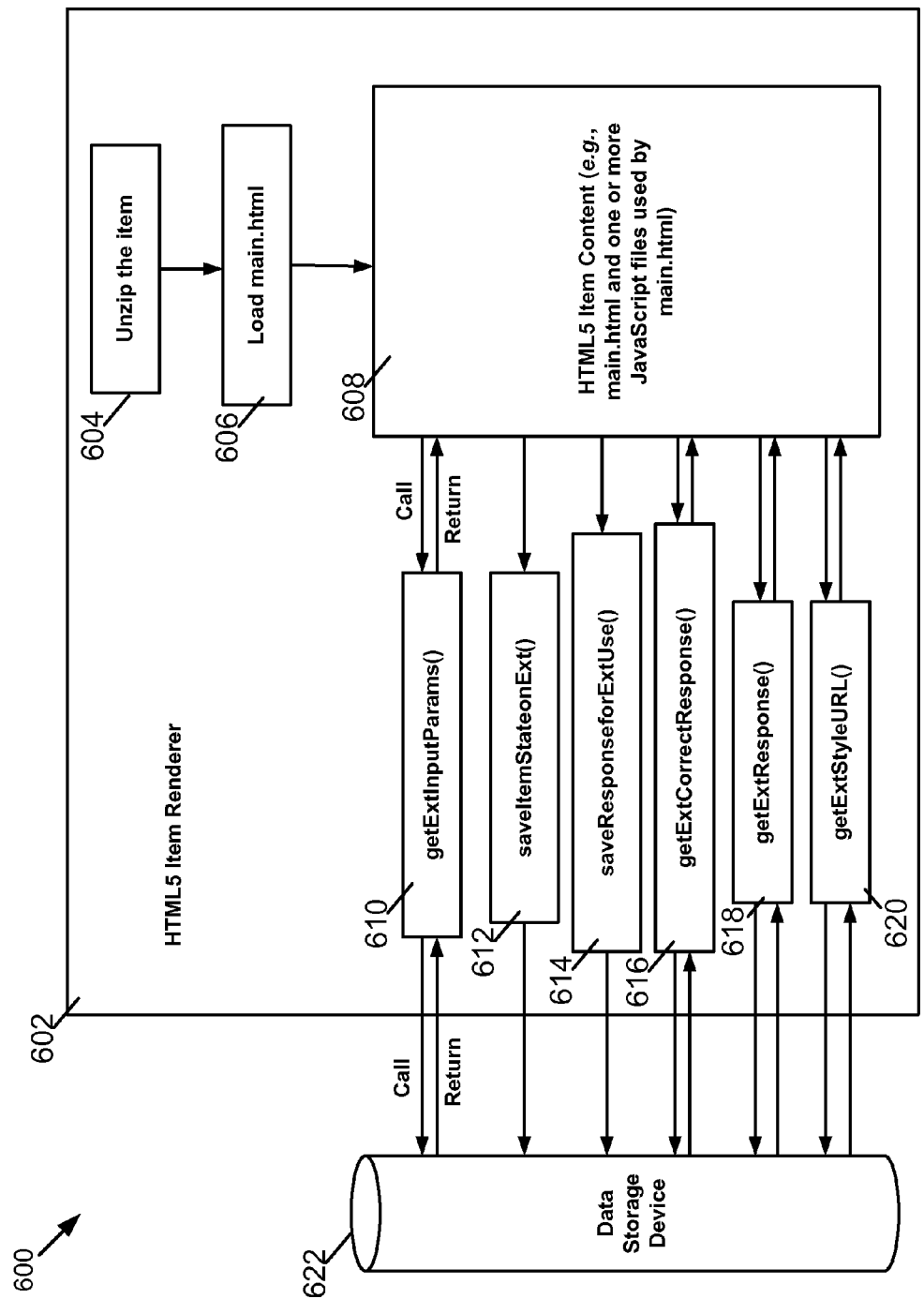
FIG. 6 depicts an example computer-implemented system for rendering content stored in a zipped file or zipped input stream.

FIG. 6 depicts an example computer-implemented system 600 for rendering content stored in a zipped file or zipped input stream. As described above, computer-executable instructions for generating an interactive display (i.e., an interactive graphical representation for display on a display device) may be included in a zipped file or a zipped input stream. In the example of FIG. 6, item content 608 included in the zipped file or zipped input stream includes an entry file named "main.html." The item content 608 included in the zipped file or input stream further includes one or more JavaScript files that are used by the main.html file. For example, the one or more JavaScript files may include the computer-executable instructions for generating the interactive display, and the main.html file may reference these JavaScript files and cause the computer-executable instructions to be executed. The item content 608 including such files may be referred to as "HTML5 item content" (e.g., reflecting the fact that the main.html file may be encoded in the HTML5 language), and a renderer 602 for rendering this content may be referred to as an "HTML5 item renderer." In rendering an assessment item, at 604, the item renderer 602 unzips the content of the zipped file or the zipped input stream. An example of the content of a zipped file or input stream is described above with reference to FIG. 5. At 606, the item renderer 602 loads main.html or returns a relative path of main.html.

After the main.html entry file is loaded, the main.html file communicates with the renderer 602 using JavaScript functions 610, 612, 614, 616, 618, 620. These JavaScript functions are implemented by the renderer 602 and are used by the main.html file for i) causing data to be transmitted from a data storage device 622 to the renderer 602, and ii) causing data to be transmitted from the renderer 602 to the data storage device 622. The transmission of data from the data storage device 622 to the renderer 602 may allow the renderer 602 to use the data in rendering an assessment item. For example, input parameters used in defining an appearance of an assessment item may be transmitted from the data storage device 622 to the renderer 602 using a getExtInputParams( ) function 610, and computer-executable instructions of the item content 608 may then be executed based on the received input parameters to render the assessment item. The transmission of data from the renderer 602 to the data storage device 622 allows the data storage device 622 to store the transmitted data (e.g., for later use or additional processing). For example, a user response to an assessment item may be received at the renderer 602 and used in updating an interactive display portion of the assessment item. If it is desired to store the user response for additional processing or evaluation, a saveResponseforExtUse( ) function 614 may be used to transmit the user response from the renderer 602 to the data storage device 622. The use of the functions 610, 612, 614, 616, 618, 620 for transmitting data between the renderer 602 and the data storage device 622 are described in greater detail below.

The computer-implemented system 600 may be implemented via a standalone computer system, or the computer-implemented system 600 may include components and subsystems that are located remotely from one another. For example, the data storage device 622 may be part of the same standalone computer system as the renderer 602, or the data storage device 622 may be located remotely from the renderer 602, such that the renderer 602 may access the data storage device 622 via a network (e.g., a local area network, the Internet, etc.). The system 600 of FIG. 6 interfaces with a user device (e.g., a desktop computer, laptop computer, smartphone, tablet computer, etc.) and causes an assessment item to be displayed on a display device of the user device. User response to the assessment item may be transmitted from the user device to the renderer 602 of the system 600.

The data storage device 622 may include a non-transitory computer-readable storage medium (e.g., a memory device, hard disk, etc.) for storing various data. In an example, the storage device 622 comprises a server or a non-transitory computer-readable storage medium that is part of a server. The data stored at the data storage device 622 may include parameters for rendering an assessment item (e.g., initial parameters defined in an XML file or extracted from an XML file), responses to assessment items, states of assessment items, and data for defining a style or appearance of an assessment item, among other data. For example, the data storage device 622 may store an XML file or data from the XML file, where the data from the XML file includes input parameters for rendering an assessment item. Example XML files including such data are described above with reference to FIGS. 3A, 3B, 4A, and 4B. The main.html file invokes the getExtInputParams( ) JavaScript function 610 of the renderer 602, thus causing the data from the XML file to be transmitted from the data storage device 622 to the renderer 602. The renderer 602 can then execute computer-executable instructions of the content 608 based on the XML data to render an interactive display portion of the assessment item.

As noted above, the data storage device 622 may also store a state of an assessment item. The state may describe a status of the assessment item at a particular point in time (e.g., a point in time that is prior to a submission of a final response to the item). For example, a final response to an assessment item may be saved when a timer expires, and the state of the assessment item may comprise response data entered by the user at a point in time prior to the expiration of the timer. In example tests where a user is able to navigate back-and-forth between different assessment items prior to submission of final responses for the items, the use of saved states may allow an intermediate state of an item to be restored when the user navigates back to the item. The main.html file invokes a saveItemStateonExt( ) JavaScript function 612 of the renderer 602 to save a state of an assessment item to the data storage device 622. For example, a user response to an assessment item may be received at the renderer 602 from a user device as the user takes a test. Prior to the completion of the test, the user response may define a state of the assessment item. If it is desired to store the state of the item to allow the state to be restored upon the user's navigation back to the item, the saveItemStateonExt( ) JavaScript function 612 may be used to transmit the state from the renderer 602 to the data storage device 622.

In addition to storing intermediate states of assessment items, the data storage device 622 may also store final responses to assessment items. The main.html file invokes a saveResponseforExtUse( ) JavaScript function 614 of the renderer 602 to save a response to an assessment item to the data storage device 622. For example, a user response to an assessment item may be received at the renderer 602, and if it is desired to store the response data (e.g., for external processing of the response data by a third party, etc.), the saveResponseforExtUse( ) JavaScript function 614 may be used to transmit the response data from the renderer 602 to the data storage device 622.

The main.html file may invoke a getExtResponse( ) function 618 of the renderer 602 to cause a saved assessment item response to be transmitted from the data storage device 622 to the renderer 602. The data storage device 622 may further store a correct response to an assessment item and various external style data for controlling an appearance of an assessment item as displayed at a user device. The main.html file may invoke a getExtCorrectResponse( ) JavaScript function 616 of the renderer 602 to cause the correct response to the assessment item to be transmitted from the data storage device 622 to the renderer 602, and the main.html file may invoke a getExtStyleURL( ) JavaScript function 620 to cause the external style data to be transmitted from the data storage device 622 to the renderer 602.

The JavaScript functions 610, 612, 614, 616, 618, 620 of FIG. 6 are implemented by the item renderer 602 based on the signatures defined in the table 700 of FIG. 7A. Thus, FIG. 7A depicts the table 700 with information on the example JavaScript functions 610, 612, 614, 616, 618, 620. As illustrated in the table 700, the getExtInputParams function is used to retrieve external initial input parameters. The external initial input parameters include parameters "showResponse" and "runMode" and also include initial parameters from the XML file that is associated with the item. Parameters "showResponse" and "runMode" are described in further detail below with reference to FIG. 7B. The getExtInputParams function does not receive input parameters, and the function returns a JavaScript Object Notation (JSON) string. The table 700 of FIG. 7A depicts a JavaScript example utilizing the getExtInputParams function:

```
var result = top.getExtInputParams( );
var x = JSON.parse(result);
```

The saveResponseforExtUse function is used to save a response from a user. Specifically, as illustrated in the table 700, the saveResponseforExtUse function returns a user response to the system (e.g., saves a user response to the data storage device 622 of FIG. 6). The saveResponseforExtUse function receives a string as input and returns a void output. The table 700 depicts a JavaScript example utilizing the saveResponseforExtUse function:

saveResponseforExtUse("the response string");

The saveItemStateonExt function is used to return an item state to the system (e.g., to save an item state to the data storage device 622 of FIG. 6). The saveItemStateonExt function receives a JSON string as input and returns a void output. The table 700 depicts a JavaScript example utilizing the saveItemStateonExt function:

saveItemStateonExt("the item state string"

The getExtResponse function is used to retrieve a user response from an external source (e.g., to retrieve a user response from the data storage device 622 of FIG. 6). The getExtResponse function does not receive any input parameters, and the function returns a string as output. The table 700 depicts a JavaScript example utilizing the getExtResponse function:

var resp=top.getExtResponse( );

The getExtCorrectResponse function is used to retrieve a correct response to an item from an external source (e.g., to retrieve a correct response from the data storage device 622 of FIG. 6). The getExtCorrectResponse function does not receive any input parameters, and the function returns a string as output. The table 700 depicts a JavaScript example utilizing the getExtCorrectResponse function:

var resp=top.getExtCorrectResponse( );

The getExtStyleURL function is used to return a uniform resource locator (URL) address of an external cascading style sheets (CSS) file that is applicable to an item. If no external CSS file is applicable, the function returns an empty string. The getExtStyleURL function does not receive any input parameters, and the function returns a string as output. The table 700 depicts a JavaScript example utilizing the getExtStyleURL function:

var url=top.getExtStyleURL( );

FIG. 7B depicts a table 750 with information on example initial parameters that may be received by a system for rendering HTML5 content. As described above with reference to FIGS. 6 and 7A, an assessment item renderer may retrieve initial parameters for rendering an assessment item via the getExtInputParams function. Initial parameters may be categorized as "system parameters" and "user parameters." System parameters are common to all items, and user parameters are item-specific parameters that may differ from item to item. The example initial parameters of FIG. 7B are system parameters and include a showResponse variable. The showResponse variable is a flag that indicates whether a response string should be displayed or hidden when displaying an item. The showResponse variable is used by the getExtInputParams function described above and takes a value of "1" if the response is to be displayed and a value of "0" if the response is to be hidden. The showResponse variable has a default value of "1."

The example initial parameters of FIG. 7B further include a runMode variable. The runMode variable is a flag that indicates whether an item should be displayed in a development mode or in a production mode. The runMode variable is used by the getExtInputParams function described above and takes a value of "1" if the item should be displayed in the development mode, such that navigation buttons should be displayed, and a value of "0" if the item should be displayed in the production mode, such that navigation buttons should be hidden. The runMode variable has a default value of "1."

Table 750 of FIG. 7B includes information on a reviewMode variable that is a flag that indicates whether an item should be displayed in a review mode, such that no changes can be made to a response to the item, or whether the item should be displayed in a normal testing mode, such that changes can be made to the response. The reviewMode variable is used by the getExtInputParams function described above and takes a value of "1" if the item should be displayed in the review mode, such that response changes are disabled, and a value of "0" if the item should not be displayed in the review mode, such that response changes are not disabled. The reviewMode variable has a default value of "0."

The example initial parameters of FIG. 7B further include a width variable. The width variable specifies a width of an item frame. The width variable is used by the getExtInputParams function described above and has an integer value specified in a string type, with a value range between 100 and 1004 pixels. The width variable has a default value of "1004." The example initial parameters also include a height variable that specifies a height of the item frame. The height variable is used by the getExtInputParams function and has an integer value specified in a string type, with a value range between 100 and 638 pixels. The height variable has a default value of 638.

Table 750 of FIG. 7B further includes information on a savedResponse variable that is a saved response from a previous visit to the item. The savedResponse variable is used by the getExtInputParams and getExtResponse functions described above and has a string value. Table 7B also includes information on a savedItemState variable that represents a saved item state from a previous visit to be restored if the tester comes back to the item again. The savedItem-State variable is used by the getExtInputParams function described above and has a string value.

The example initial parameters of FIG. 7B further include a sequenceNo variable. The sequenceNo variable represents a saved sequence number from a previous visit for multi-page items. The sequenceNo variable is used by the getExtInputParams function described above and has an integer value specified in a string type. The sequenceNo variable has a default value of "1." Table 7B also includes information on a correctResponse variable that represents a correct answer to an item. The correctResponse variable is used by the getExtCorrectResponse function described previously and has a string value. The example initial parameters of FIG. 7B may be defined in the XML file that is associated with the item, or the example initial parameters may be stored elsewhere. It should be understood that the initial parameters described above are exemplary only and that additional initial parameters may be used in other examples. Further, aspects of the initial parameters described above (e.g., values, default values, etc.) are exemplary only and may change in other examples.

Figure 8:
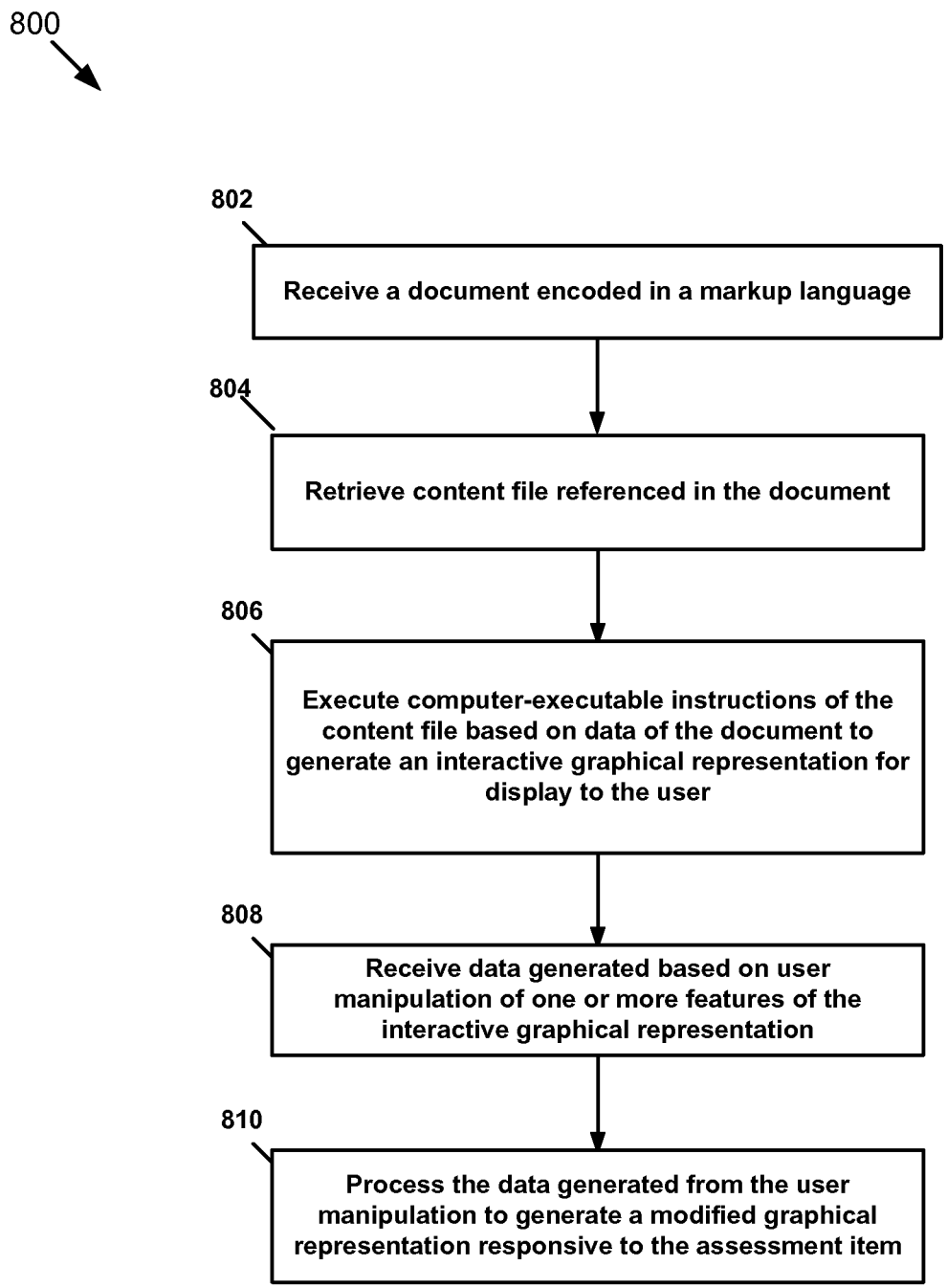
FIG. 8 is a flowchart depicting operations of an example computer-implemented method for rendering an assessment item.

FIG. 8 is a flowchart 800 depicting operations of an example computer-implemented method for rendering an assessment item. At 802, a document encoded in a markup language is received. The document includes data that relates to at least one of an appearance and content of an assessment item, and the document includes a reference to a content file. At 804, the content file is retrieved with a processing system, where the content file includes computer-executable instructions for generating an interactive graphical representation for display on a display device. The interactive graphical representation includes one or more features with which a user interacts to respond to the assessment item to generate a modified graphical representation responsive to the assessment item. At 806, using the processing system, the computer-executable instructions are executed based on the data of the document to generate the interactive graphical representation for display to the user. At 808, data generated based on user manipulation of the one or more features of the interactive graphical representation is received at the processing system. At 810, the data generated from the user manipulation is processed to generate the modified graphical representation responsive to the assessment item.

Figure 9A:
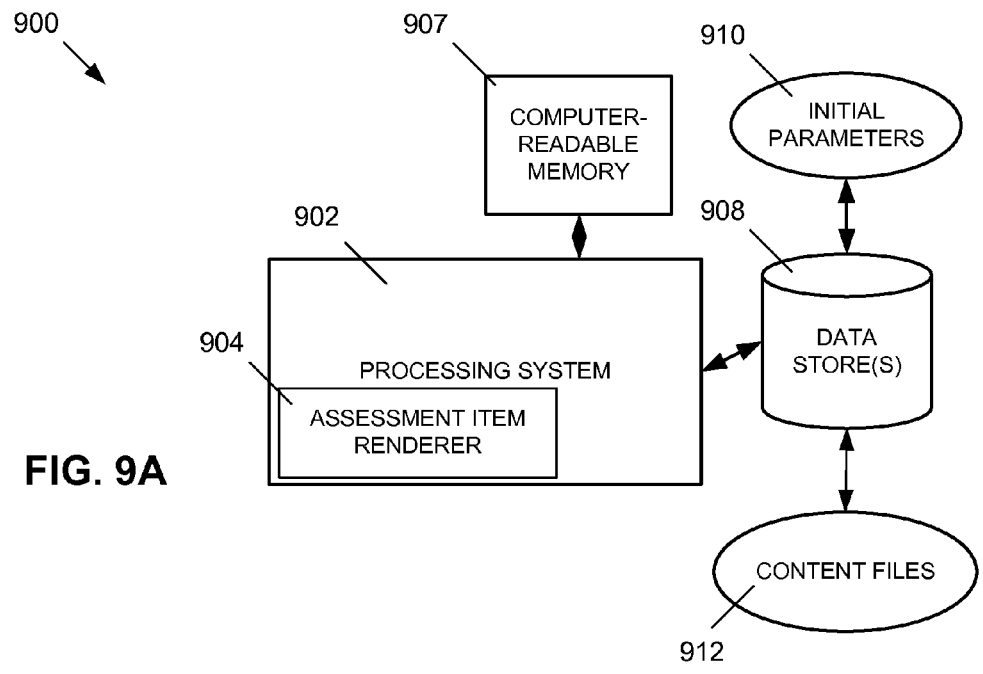
FIGS. 9A, 9B, and 9C depict example systems for rendering an assessment item.
Figure 9B:
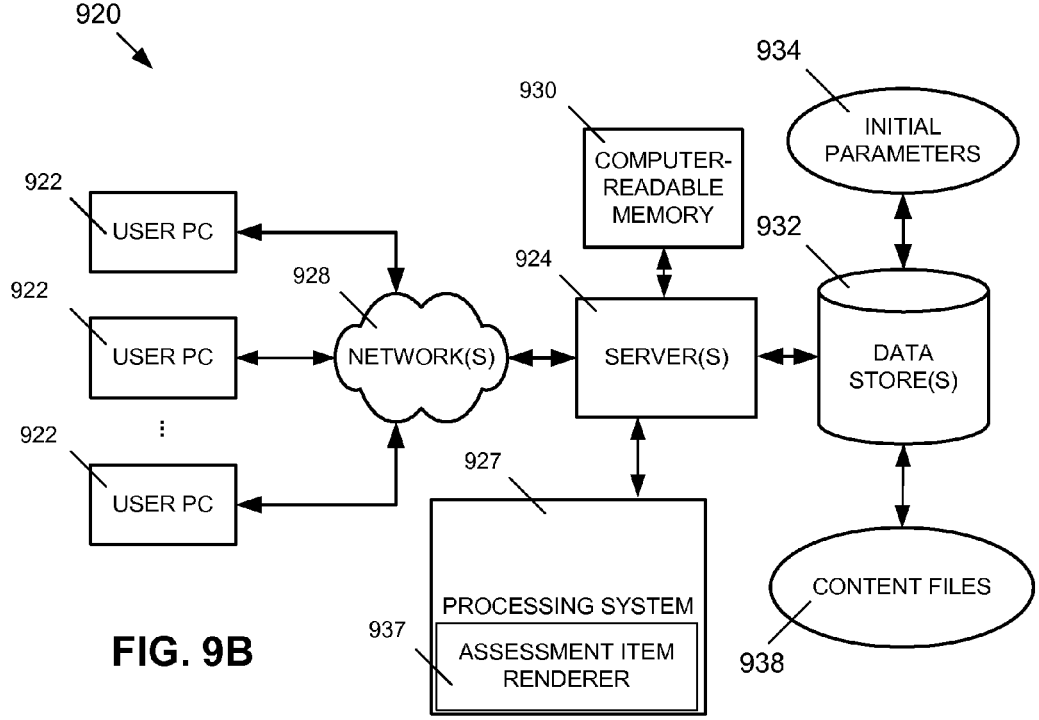
Figure 9C:
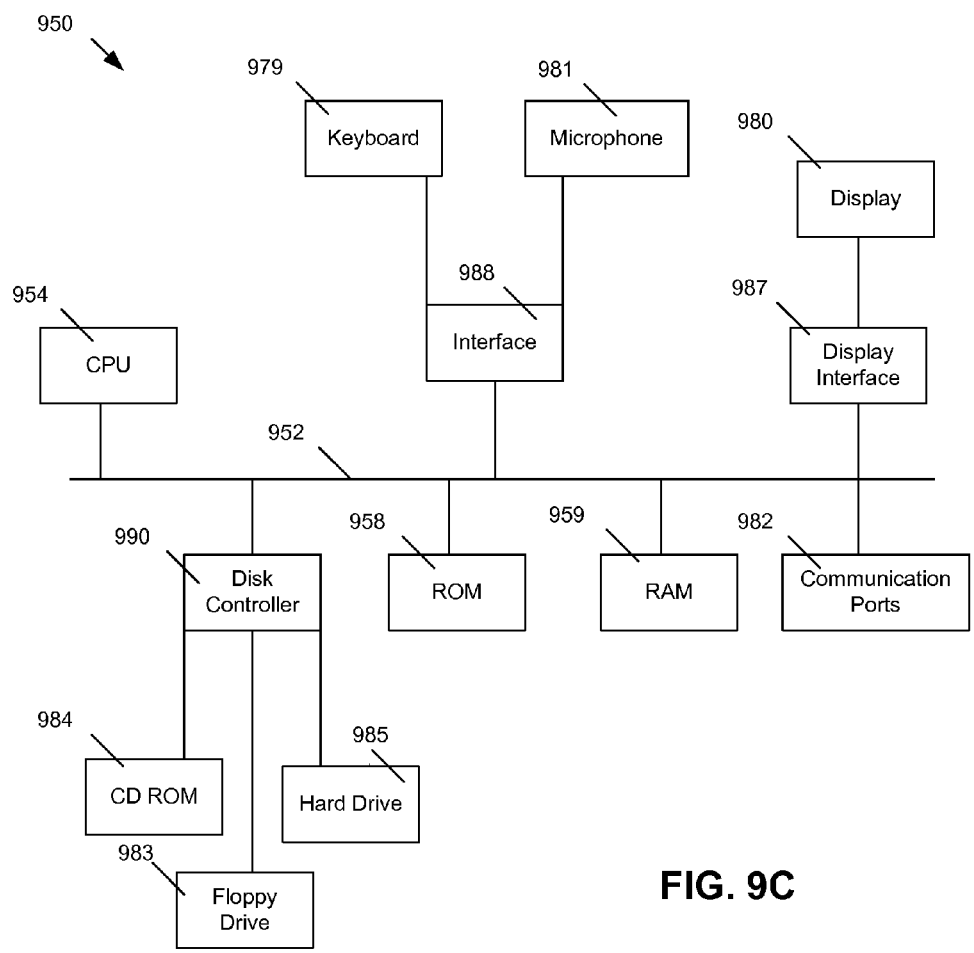

FIGS. 9A, 9B, and 9C depict example systems for implementing the approaches described herein for rendering an assessment item. For example, FIG. 9A depicts an exemplary system 900 that includes a standalone computer architecture where a processing system 902 (e.g., one or more computer processors located in a given computer or in multiple computers that may be separate and distinct from one another) includes an assessment item renderer 904 being executed on the processing system 902. The processing system 902 has access to a computer-readable memory 907 in addition to one or more data stores 908. The one or more data stores 908 may include initial parameters 910 as well as content files 912. The processing system 902 may be a distributed parallel computing environment, which may be used to handle very large-scale data sets.

FIG. 9B depicts a system 920 that includes a client-server architecture. One or more user PCs 922 access one or more servers 924 running an assessment item renderer 937 on a processing system 927 via one or more networks 928. The one or more servers 924 may access a computer-readable memory 930 as well as one or more data stores 932. The one or more data stores 932 may include initial parameters 934 as well as content files 938.

FIG. 9C shows a block diagram of exemplary hardware for a standalone computer architecture 950, such as the architecture depicted in FIG. 9A that may be used to include and/or implement the program instructions of system embodiments of the present disclosure. A bus 952 may serve as the information highway interconnecting the other illustrated components of the hardware. A processing system 954 labeled CPU (central processing unit) (e.g., one or more computer processors at a given computer or at multiple computers), may perform calculations and logic operations required to execute a program. A non-transitory processor-readable storage medium, such as read only memory (ROM) 958 and random access memory (RAM) 959, may be in communication with the processing system 954 and may include one or more programming instructions for performing the method of rendering an assessment item. Optionally, program instructions may be stored on a non-transitory computer-readable storage medium such as a magnetic disk, optical disk, recordable memory device, flash memory, or other physical storage medium.

In FIGS. 9A, 9B, and 9C, computer readable memories 907, 930, 958, 959 or data stores 908, 932, 983, 984, 988 may include one or more data structures for storing and associating various data used in the example systems for rendering an assessment item. For example, a data structure stored in any of the aforementioned locations may be used to store data from XML files, initial item parameters, and/or data for other variables described herein. A disk controller 990 interfaces one or more optional disk drives to the system bus 952. These disk drives may be external or internal floppy disk drives such as 983, external or internal CD-ROM, CD-R, CD-RW or DVD drives such as 984, or external or internal hard drives 985. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 990, the ROM 958 and/or the RAM 959. The processor 954 may access one or more components as required.

A display interface 987 may permit information from the bus 952 to be displayed on a display 980 in audio, graphic, or alphanumeric format. Communication with external devices may optionally occur using various communication ports 982.

In addition to these computer-type components, the hardware may also include data input devices, such as a keyboard 979, or other input device 981, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method for rendering an educational assessment item, the method comprising:
   receiving an extensible markup language (XML) document, wherein the XML document includes data that relates to at least one of an appearance and content of an educational assessment item, and wherein the XML document includes a name or address of an archive file comprising a plurality of files;
   retrieving the archive file with a processing system, the archive file including computer-executable instructions in a JavaScript programming language for generating a figural response item for display on a display device, wherein the figural response item includes one or more graphical features which a user modifies in order to respond to the educational assessment item to generate one or more modified graphical features responsive to the educational assessment item;
   executing, using the processing system, the computer-executable instructions based on the data of the XML document to generate the interactive graphical representation for display to the user;
   receiving, at the processing system, data generated based on user manipulation of the one or more features of the interactive graphical representation; and
   processing the data generated from the user manipulation to generate the modified graphical representation responsive to the educational assessment item.

2. The computer-implemented method of claim 1, wherein the archive file is separate from the XML document.

3. The computer-implemented method of claim 1, wherein the archive file includes:
   an entry file configured to invoke a plurality of functions, the plurality of functions including:
      a first function for retrieving the data from the XML document, and
      a second function for saving the data generated from the user manipulation to a storage device or a server; and
   one or more JavaScript files including the computer-executable instructions.

4. The computer-implemented method of claim 3, wherein the executing of the computer-executable instructions includes:
   unpackaging the archive file;
   opening the entry file;
   after the opening of the entry file, invoking the first function via the entry file to retrieve the data from the XML document; and
   executing the computer-executable instructions included in the one or more JavaScript files based on the retrieved data to generate the graphical representation,
   wherein the second function is invoked via the entry file to save the data generated from the user manipulation to the storage device or the server after the generating of the graphical representation.

5. The computer-implemented method of claim 1, wherein the one or more features with which the user interacts include a text input box, a checkbox, a button, or a graphical component that enables the user to:
   generate or manipulate a graph that is displayed in the graphical representation;
   generate or manipulate a number line that is displayed in the graphical representation;
   arrange graphical objects for presentation or for execution of a computer simulation in the graphical representation; or
   generate or manipulate a line plot that is displayed in the graphical representation, wherein the data of the XML document defines a height and width of the graph, number line, or plot.

6. The computer-implemented method of claim 1, wherein the XML document and the archive file are received from an item-banking database that is stored on a non-transitory computer-readable storage medium.

7. The computer implemented method of claim 1, wherein the archive file is a packaging file.

8. The computer implemented method of claim 1, wherein the plurality of files include information which cause the computing device when executing the instructions to generate a form to serve as the figural response item that:
   presents, to a user on a graphical display, an educational assessment item in a graphical form, wherein the educational assessment item is for testing the knowledge of a user relating to one or more concepts of testable subject matter;
   receives, from the user via an input device, input that cause the computing device to modify the graphical form of the educational assessment item by:
      editing a graph;
      creating a graph;
      creating an image,
      manipulating one or more images; or
      manipulating one or more multimedia elements;
   presenting, to the user via the graphical display, a graphical form displaying a modified educational assessment item based on the input;
   the method further comprising generating responsive data, based on the modified educational assessment item, to serve as the data generated based on user manipulation of the one or more features of the interactive graphical representation.

9. A system for rendering an educational assessment item, the system comprising:
  a processing system; and
  a memory in communication with the processing system, wherein the processing system is configured to execute steps comprising:
  receiving an extensible markup language (XML) document, wherein the XML, document includes data that relates to at least one of an appearance and content of an assessment item, and wherein the XML document includes a name or address of an archive file comprising a plurality of files;
  retrieving the archive file, the archive file including computer-executable instructions in a JavaScript programming language for generating an interactive graphical representation for display on a display device, wherein the interactive graphical representation includes one or more features with which a user interacts to respond to the assessment item to generate a modified graphical representation responsive to the assessment item;
  executing the computer-executable instructions based on the data of the XML document to generate the interactive graphical representation for display to the user;
  receiving data generated based on user manipulation of the one or more features of the interactive graphical representation; and
  processing the data generated from the user manipulation to generate the modified graphical representation responsive to the assessment item.

10. The system of claim 9, wherein the archive file is separate from the XML document.

11. The system of claim 9, wherein the archive file includes:
  an entry file configured to invoke a plurality of functions, the plurality of functions including:
    a first function for retrieving the data from the XML document, and
    a second function for saving the data generated from the user manipulation to a storage device or a server; and
  one or more JavaScript files including the computer-executable instructions.

12. The system of claim 11, wherein the executing of the computer-executable instructions includes:
  unpackaging the archive file;
  opening the entry file;
  after the opening of the entry file, invoking the first function via the entry file to retrieve the data from the XML document; and
  executing the computer-executable instructions included in the one or more JavaScript files based on the retrieved data to generate the graphical representation, wherein the second function is invoked via the entry file to save the data generated from the user manipulation to the storage device or the server after the generating of the graphical representation.

13. The system of claim 9, wherein the one or more features with which the user interacts include a text input box, a checkbox, a button, or a graphical component that enables the user to:
  generate or manipulate a graph that is displayed in the graphical representation;
  generate or manipulate a number line that is displayed in the graphical representation;
  arrange graphical objects for presentation or for execution of a computer simulation in the graphical representation; or
  generate or manipulate a line plot that is displayed in the graphical representation, wherein the data of the XML document defines a height and width of the graph, number line, or plot.

14. The system of claim 9, wherein the XML document and the archive file are received from an item-banking database that is stored on a non-transitory computer-readable storage medium.

15. A non-transitory computer-readable storage medium for rendering an educational assessment item, the computer-readable storage medium comprising computer-executable instructions which, when executed, cause a processing system to execute steps comprising:
  receiving an extensible markup language (XML) document, wherein the XML document includes data that relates to at least one of an appearance and content of an assessment item, and wherein the XML document includes a name or address of an archive file comprising a plurality of files;
  retrieving the archive file, the archive file including computer-executable instructions in a JavaScript programming language for generating an interactive graphical representation for display on a display device, wherein the interactive graphical representation includes one or more features with which a user interacts to respond to the assessment item to generate a modified graphical representation responsive to the assessment item;
  executing the computer-executable instructions based on the data of the XML document to generate the interactive graphical representation for display to the user;
  receiving data generated based on user manipulation of the one or more features of the interactive graphical representation; and
  processing the data generated from the user manipulation to generate the modified graphical representation responsive to the assessment item.

16. The non-transitory computer-readable storage medium of claim 15, wherein the archive file is separate from the XML document.

17. The non-transitory computer-readable storage medium of claim 15, wherein the archive file includes:
  an entry file configured to invoke a plurality of functions, the plurality of functions including:
    a first function for retrieving the data from the XML document, and
    a second function for saving the data generated from the user manipulation to a storage device or a server; and
  one or more JavaScript files including the computer-executable instructions.

18. The non-transitory computer-readable storage medium of claim 17, wherein the executing of the second computer-executable instructions includes:
  unpackaging the archive file;
  opening the entry file;
  after the opening of the entry file, invoking the first function via the entry file to retrieve the data from the XML document; and
  executing the computer-executable instructions included in the one or more JavaScript files based on the retrieved data to generate the graphical representation, wherein the second function is invoked via the entry file to save the data generated from the user manipulation to the storage device or the server after the generating of the graphical representation.

19. The non-transitory computer-readable storage medium of claim 15, wherein the one or more features with which the user interacts include a text input box, a checkbox, a button, or a graphical component that enables the user to:
- generate or manipulate a graph that is displayed in the graphical representation;
- generate or manipulate a number line that is displayed in the graphical representation;
- arrange graphical objects for presentation or for execution of a computer simulation in the graphical representation; or
- generate or manipulate a line plot that is displayed in the graphical representation, wherein the data of the XML document defines a height and width of the graph, number line, or plot.

20. The non-transitory computer-readable storage medium of claim 15, wherein the XML document and the archive file are received from an item-banking database that is stored on a non-transitory computer-readable storage medium.

* * * * *